US009443548B2

(12) United States Patent
Yamada et al.

(10) Patent No.: US 9,443,548 B2
(45) Date of Patent: Sep. 13, 2016

(54) HOLOGRAM REPRODUCING DEVICE AND HOLOGRAM REPRODUCING METHOD

(71) Applicant: Hitachi-LG Data Storage, Inc., Tokyo (JP)

(72) Inventors: Kenichiro Yamada, Tokyo (JP); Kazuyoshi Yamazaki, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/918,606

(22) Filed: Oct. 21, 2015

(65) Prior Publication Data
US 2016/0125906 A1 May 5, 2016

(30) Foreign Application Priority Data

Oct. 31, 2014 (JP) .................................. 2014-222176

(51) Int. Cl.
G11B 7/00 (2006.01)
G11B 7/0065 (2006.01)

(52) U.S. Cl.
CPC .................................. *G11B 7/0065* (2013.01)

(58) Field of Classification Search
CPC . G11B 7/0065; G11B 7/083; G11B 7/00781; G11B 7/00; G11B 7/1381
USPC .............................. 369/103, 112.23, 118, 116
See application file for complete search history.

(56) References Cited

U.S. PATENT DOCUMENTS 7,804,758 B2 * 9/2010 Fukuda ................ G11B 7/0065
369/103
2012/0008476 A1 1/2012 Kuroda et al.

FOREIGN PATENT DOCUMENTS

WO 2011/018836 A1 2/2011

* cited by examiner

*Primary Examiner* — Nabil Hindi
(74) *Attorney, Agent, or Firm* — Mattingly & Malur, PC

(57) ABSTRACT

A hologram reproducing device which reproduces information from a recording medium having information recorded by interfering a signal beam and a reference beam, provided with a first light-angle change unit which changes an irradiation angle of the reference beam; a second light-angle change unit which changes the irradiation angle of the reference beam; a photodetector which detects a reproduction beam; a first light-angle drive-signal output unit which outputs a drive signal of the first light-angle change unit; a first light-angle control unit which controls the first light-angle change unit on the basis of the output of the photodetector; a second light-angle drive-signal output unit which outputs a drive signal of the second light-angle change unit; a second light-angle control unit which controls the second light-angle change unit; and a light-angle interpolation processing unit which controls a control target value of the second light-angle control unit.

12 Claims, 15 Drawing Sheets

HOLOGRAM REPRODUCING DEVICE AND HOLOGRAM REPRODUCING METHOD

BACKGROUND OF THE INVENTION

The present invention relates to a device for reproducing information from a recording medium by using holography.

When a hologram is reproduced, the signal quality of a reproduction beam is deteriorated because a hologram recording medium is expanded and contracted due to temperature and moisture absorption, and the angle and interval of recorded diffraction gratings are changed. To compensate the above, it is necessary to adjust the incidence angle of a reference beam irradiated to the recording medium. WO2011/018836 describes "According to the present invention, there is provided an information-reproducing device which performs feedback control of the wavelength and the irradiation angle of the reference beam by detecting a feature extraction amount from the reproduced information light."

SUMMARY OF THE INVENTION

To secure the signal quality of the reproduction beam, the hologram optical information-reproducing device must adjust the angle of the reference beam into a range that reproduction can be made for all of plural multiple-recorded page data. Considering that the multiplex number of records in one hologram is increased and recording capacity is increased to the terabyte volume, the adjustment of the incidence angle of the reference beam requires control technology with very high static accuracy of few millimeter degrees. Further, to prevent the transfer speed from lowering at the time of reproduction, the hologram optical information-reproducing device is required to decrease the time required for adjustment of the incidence angle of the reference beam as much as possible. In other words, the hologram optical information-reproducing device needs to adjust the incidence angle of the reference beam highly accurately in a short time.

Here, as to the incidence angle of the reference beam to the recording medium, it is assumed that the incidence angle serving for multiple angles of the reference beam of page data is Bragg angle $\theta$, and the incidence angle of the reference beam on a plane in a substantially vertical direction against the plane including the optical axis of the signal beam and the normal line of the recording medium is pitch-angle $\phi$ as shown in FIG. 4. As described in WO2011/018836, when two optical elements which are movable to angles in $\theta$ and $\phi$ directions respectively are combined to realize the incidence angle change, the orthogonal angle is deviated due to geometric arrangements of both optical elements considering the mass production of the hologram optical information-reproducing device. For example, as shown in FIG. 5, it is known that when the shaft as the rotation center of the optical element for varying the reference beam angle $\theta$ falls in a state (b) having an angle deviation by $\Delta\phi$ as the orthogonal angle in comparison with an ideal state (a) not having an orthogonal angle deviation, the angle deviation amount of the pitch-angle $\phi$ against the ideal state (a) in accordance with Bragg angle $\theta$ varies linearly depending on a geometrical arrangement as shown in FIG. 6. As described above, to secure the signal quality of the reproduction beam, it is necessary to adjust the incidence angle of the reference beam to an optimum angle. The method for adjusting the incidence angle of the reference beam described in WO2011/018836 detects an error by detecting as a reproduced image a reproduction beam which is obtained by diffraction of the incident reference beam on the optical recording medium by a photodetector such as CCD and converting it into a luminance signal. Since a sufficient exposure time is required to obtain an analyzable reproduced image, the number of times of obtaining the image by the CCD must be reduced as much as possible when the transfer speed is taken into consideration. However, when the adjustment by the photodetector described in WO2011/018836 is conducted every time Bragg angle $\theta$ is varied for each page at multiplex-recorded points, the transfer speed is lowered considerably.

Therefore, the object of the present invention is to realize high quality reproduction in a hologram optical information-reproducing device which combines two optical elements to change a reference beam angle, while keeping high transfer speed even when the both optical elements have an orthogonal angle deviation caused by a mounting error or the like.

The above problem is solved by the invention described in, for example, claims. The present application includes plural means for solving the problem. One of them is, for example, a hologram reproducing device which reproduces information from a recording medium having information recorded by interfering a signal beam and a reference beam, comprising a first light-angle change unit for changing an irradiation angle of the reference beam to the recording medium in a plane including an optical axis of the signal beam and a normal line of the recording medium; a second light-angle change unit for changing the irradiation angle of the reference beam in a plane in a substantially vertical direction to the plane including the optical axis of the signal beam and the normal line of the recording medium; a photodetector for detecting a reproduction beam which is from the recording information medium; a first light angle drive signal output unit for outputting a drive signal of the first light-angle change unit; a first light angle control unit for controlling the first light-angle change unit via the light angle drive signal output unit on the basis of the output of the photodetector; a second light angle drive signal output unit for outputting a drive signal of the second light-angle change unit; a second light angle control unit for controlling the second light-angle change unit via the second light angle drive signal output unit; and a light angle interpolation processing unit for controlling a control target value of the second light angle control unit by performing interpolation processing of a control target value of the first light angle control unit and outputting the interpolation processed control target value to the second light angle control unit.

The present invention can realize high reproduction quality while maintaining high transfer speed at multiple-recorded points.

DETAILED DESCRIPTION OF THE EMBODIMENTS

Embodiments of the present invention will be described below with reference to the drawings.

Embodiment 1

Figure 1:
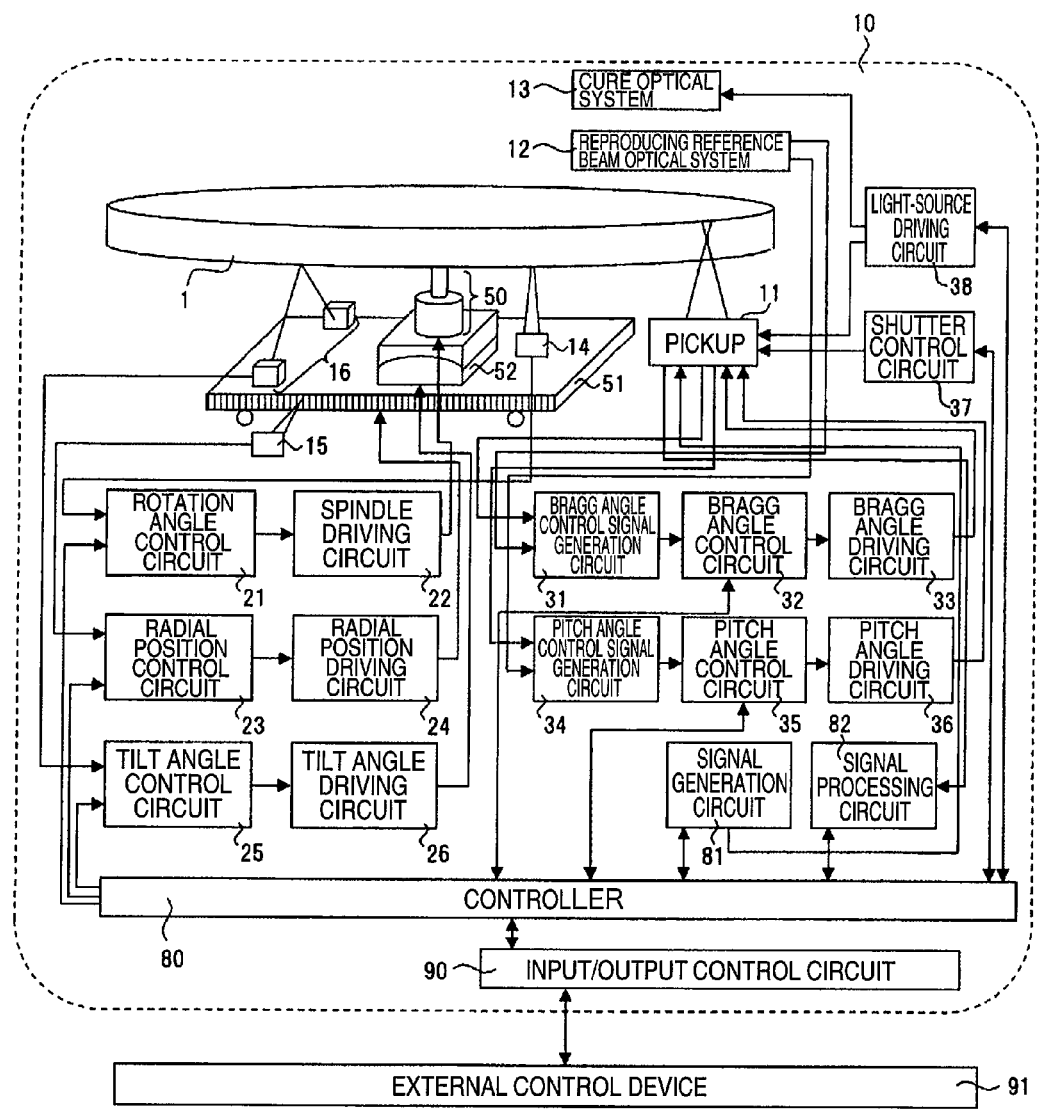
FIG. 1 is a block diagram showing a hologram optical information-reproducing device.

The embodiments of the present invention are described below with reference to the accompanying drawings. FIG. 1 is a block diagram showing an optical-information reproducing device for a hologram recording medium from which digital information is reproduced by using holography.

A hologram optical-information reproducing device 10 is connected to an external control device 91 via an input/output control circuit 90. When information is recorded in a hologram recording medium 1, the hologram reproducing device 10 receives an information signal to be recorded from the external control device 91 by the input/output control circuit 90. When information is reproduced from the hologram recording medium 1, the hologram reproducing device 10 transmits the reproduced information signal to the external control device 91 by the input/output control circuit 90.

The hologram optical-information reproducing device 10 includes a pickup 11, a reproducing reference-beam optical system 12, a cure optical system 13, a disc-rotation-angle detecting sensor 14, a radial-position detecting sensor 15, a spindle motor 50, and a radially transporting part 51.

The spindle motor 50 has a medium attaching/detaching part (not shown) that can attach/detach the hologram recording medium 1 to/from its rotating shaft, and the hologram recording medium 1 is configured to be rotatable by the spindle motor 50. It is also configured that the hologram recording medium 1 can be moved radially by the radially transporting part 51 with the position of the pickup 11 determined as reference.

The position where a signal beam and/or a reference beam is radiated is determined according to the position of the pickup 11 described later and fixed to the device. In this embodiment, the spindle motor 50, a movable part of the radially transporting part 51, and a moving stage 51 function as means for changing the position on the hologram recording medium 1 where the signal beam and/or reference beam is irradiated.

The rotation-angle detecting sensor 14 is used to detect a rotation angle of the hologram recording medium 1. The rotation-angle detecting sensor 14 uses, for example, an angle detecting mark provided on the hologram recording medium 1 to detect a rotation angle of the hologram recording medium 1. An output signal of the rotation-angle detecting sensor 14 is input to a rotation-angle control circuit 21. To change a rotation angle at which the signal beam and the reference beam are irradiated, the rotation-angle control circuit 21 generates a drive signal according to the output signal of the rotation-angle detecting sensor 14 and an instruction signal from a controller 80 and drives the spindle motor 50 via a spindle driving circuit 22. Thus, the rotation angle of the hologram recording medium 1 can be controlled.

The radial-position detecting sensor 15 is used to detect a position of the movable part of the radially transporting part 51. For example, the radial position detecting sensor 15 uses a position detecting pattern to detect the position of the movable part of the radially transporting part 51 where a scale having a predetermined pattern is fixed. The output signal of the radial-position detecting sensor 15 is input to a radial-position control circuit 23. To change a radial position where the signal beam and the reference beam are irradiated, the radial-position control circuit 23 generates a drive signal according to the output signal of the radial-position detecting sensor 15 and the instruction signal from the controller 80, and drives the radially transporting part 51 via a radial-position driving circuit 24. Thus, the hologram recording medium 1 is conveyed in a radial direction, and the radial position where the signal beam and the reference beam are irradiated can be controlled. A tilt-angle detecting sensor 16 is used to detect the inclination of the pitch direction of the hologram recording medium 1. For example, the tilt-angle detecting sensor 16 irradiates a beam from the irradiation part of the tilt-angle detecting sensor to the hologram recording medium 1 and receives the beam by a detection unit to detect the inclination of the hologram recording medium 1 in the pitch direction. The output signal of the tilt-angle detecting sensor 16 is input to the tilt-angle control circuit 25. To change the pitch angle of the hologram recording medium 1 to the pickup 11, the tilt-angle control circuit 25 generates a drive signal according to the output signal of the tilt-angle detecting sensor 16 and the instruction signal from the controller 80, and drives a tilt-angle change unit 52 via a tilt-angle driving circuit 26. Thus, the pitch angle of the hologram recording medium 1 to the pickup 11 can be changed.

The pickup 11 irradiates the reference beam and the signal beam to the hologram recording medium 1 to record digital information in the recording medium by using holography. At this time, the information signal to be recorded is sent by the controller 80 to a spatial light modulator described later within the pickup 11 via a signal generation circuit 81, and the signal beam is modulated by the spatial light modulator.

To reproduce information recorded in the hologram recording medium 1, the reproducing reference-beam optical system 12 generates a light wave for entering the reference beam, which is emitted from the pickup 11, into the hologram recording medium 1 in a direction opposite to that at the time of recording. The reproduction beam to be reproduced by the reproducing reference beam is detected by a photodetector described later within the pickup 11 to reproduce a signal by a signal processing circuit 82.

The reference beam angle is controlled by generating an incidence angle serving as multiple angles of the reference beam of page data and a drive signal for Bragg angle θ by a Bragg angle control circuit 32 to drive an actuator 222 described later within the pickup 11 via a Bragg angle driving circuit 33, and generating an incidence angle of the reference beam on a plane in a substantially vertical direction to a plane including an optical axis of the signal beam and a normal line of the recording medium and a drive signal by a pitch-angle control circuit 35 for the pitch-angle θ to drive an actuator 220 described later within the pickup 11 via a pitch-angle driving circuit 36, and driving an actuator 225 described later within the reproducing reference-beam optical system 12. A Bragg angle control signal generation circuit 31 generates a signal to be used to control the Bragg angle from the output signal of at least one of the pickup 11 and the reproducing reference-beam optical system 12. The Bragg-angle control circuit 32 controls by using the output signal of the Bragg-angle control-signal generation circuit 31 according to the instruction from the controller 80. Similarly, a pitch-angle control-signal generation circuit 34 generates a signal for controlling the pitch angle from the output signal of at least one of the pickup 11 and the reproducing reference-beam optical system 12. The pitch-angle control circuit 35 controls by using the output signal of the Bragg-angle control-signal generation circuit 31 according to the instruction from the controller 80.

Irradiation time of the reference beam and the signal beam irradiated to the hologram recording medium 1 can be adjusted by controlling an open/close time of a shutter 203 within the pickup 11 by the controller 80 via a shutter control circuit 37.

The cure optical system 13 plays a role to generate a light beam used for precure and postcure of the hologram recording medium 1. The precure is a preprocess to irradiate a predetermined light beam in advance before the reference beam and the signal beam are irradiated to a desired position when information is recorded on a desired position in the hologram recording medium 1. The postcure is a postprocess to irradiate a predetermined light beam to make additional recording impossible at the desired position after recording the information at the desired position in the hologram recording medium 1. The light beam used for the precure and postcure is preferably required to be incoherent light, namely light with low coherence.

A predetermined light-source driving current is supplied from a light-source driving circuit 38 to the light sources within the pickup 11 and the cure optical system 13, and a light beam with a predetermined light quantity can be emitted from the individual light sources.

The pickup 11 and the cure optical system 13 may be simplified by integrating several optical system structures or all optical system structures into one.

Figure 2:
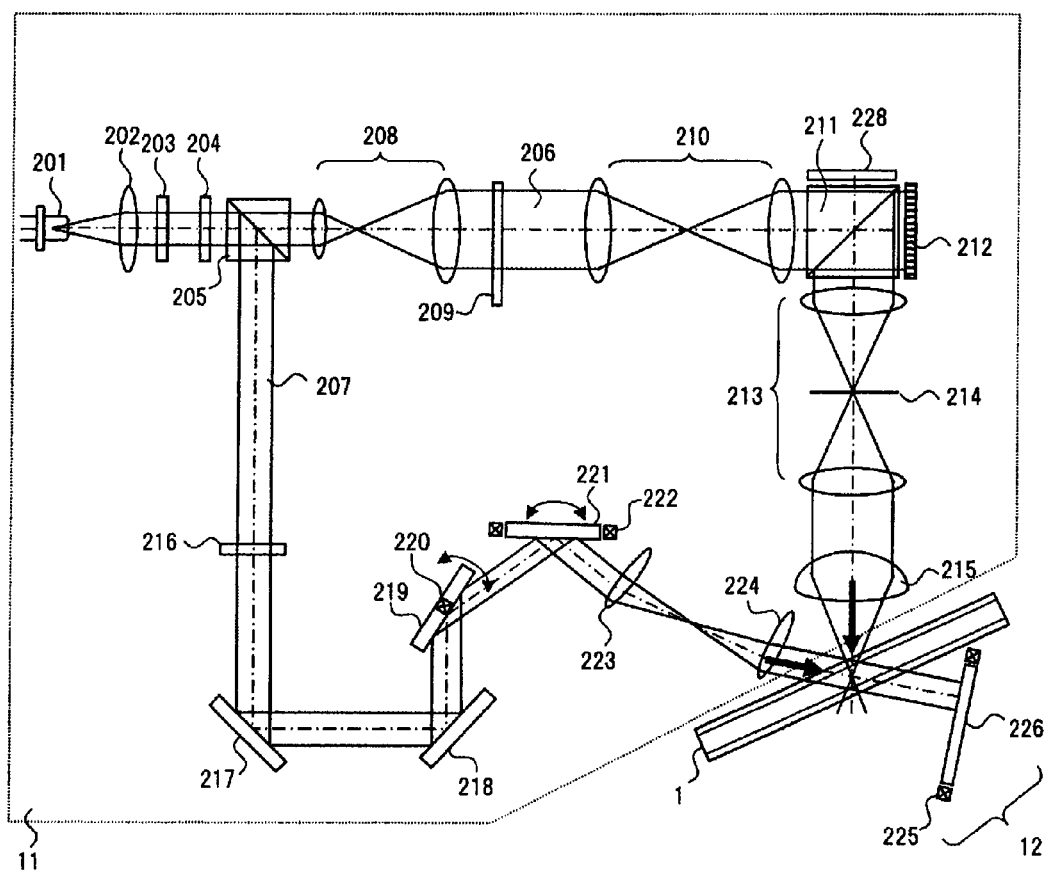
FIG. 2 is a schematic diagram showing a pickup when the hologram optical information-reproducing device is recording.

FIG. 2 shows a recording principle in an example of a basic optical system structure of the pickup 11 and the reproducing reference-beam optical system 12 in the hologram reproducing device 10. The reproducing reference-beam optical system 12 comprises the actuator 225 and a mirror 226. The actuator 225 can use, for example, a galvanometer.

The light beam radiated from a light source 201 is transmitted through a collimator lens 202 and enters the shutter 203. When the shutter 203 is open, the light beam is emitted through the shutter 203, has a polarization direction controlled such that a light quantity ratio of P polarization and S polarization becomes a desired ratio by an optical element 204 which is configured of, for example, a ½-wavelength plate, and enters a PBS (Polarization Beam Splitter) prism 205.

The light beam transmitted through the PBS prism 205 serves as a signal beam 206, has its diameter expanded by a beam expander 208, is transmitted through a phase mask 209, a relay lens 210 and a PBS prism 211 and enters a spatial light modulator 212.

The signal beam 206 is added with phase information when it is transmitted through the phase mask 209. The signal beam added with information by the spatial light modulator 212 is reflected by the PBS prism 211 and propagates through a relay lens 213 and a spatial filter 214. Then, the signal beam is collected to the hologram recording medium 1 by an objective lens 215.

Meanwhile, the light beam reflected by the PBS prism 205 serves as a reference beam 207, is set by a polarization-direction converting element 216 to a predetermined polarization direction according to the time of recording or reproducing, and enters an optical element 219 via a mirror 217 and a mirror 218. The optical element 219 can have a reflection angle adjusted in a pitch angle direction by the actuator 220. The light beam reflected by the optical element 219 enters an optical element 221. The optical element 221 can have a reflection angle adjusted in a Bragg angle direction by an actuator 222. The light beam reflected by the optical element 221 passes through the lens 223 and the lens 224, and enters the hologram recording medium 1. For example, a reflection type prism is used for the optical element 221.

Figure 7:
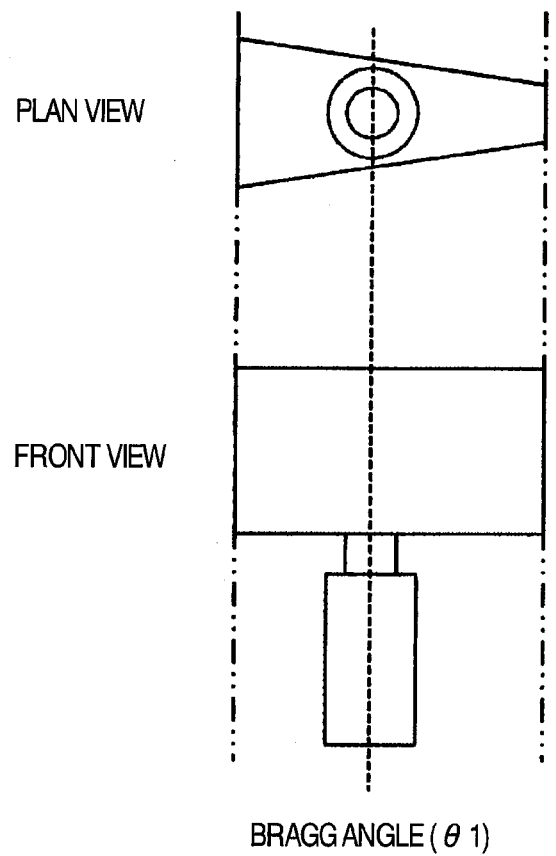
FIG. 7 shows plan and front views when a prism is attached to the actuator.

A mirror is commonly used for an optical element for changing the angle of the reference beam, but it is known to use a method using, for example, a prism shown in FIG. 7 instead of a mirror aiming at improvement of settling accuracy. Since the mirror uses total reflection, the optical axis angle changes by an angle which is double of the driving amount of the mirror driving unit, but when the prism is used, it can be determined that an optical axis change amount is smaller than that of the mirror depending on the optical design when the driving amount is the same. As described above, since high settling accuracy is required for adjustment of the incidence angle of the reference beam, it is desirable to control not by a mirror but by a prism in order to improve the settling accuracy. But, since the prism is thick, the moment of inertia around the drive shaft becomes larger than that of the mirror when its drive is taken into consideration. Generally, time required for settling becomes longer as the moment of inertia becomes larger, so that the time required for adjustment of the reference beam angle becomes long, and the transfer speed when reproducing lowers. Therefore, this embodiment provides a specially large effect when the prism is sued for the optical element 221. However, a mirror may be used for the optical element 221.

A galvanometer can be used for the actuator 220 and the actuator 222. The optical element and the actuator used to set the incidence angle of the reference beam may be an element for converting a wave front of the reference beam.

Thus, when the signal beam and the reference beam are entered to overlap mutually into the hologram recording medium 1, an interference fringe pattern is formed in the recording medium, and this pattern is written in the recording medium to record information. Further, angle multiplex recording can be made because the Bragg angle of the reference beam which enters the hologram recording medium 1 can be varied by the actuator 222.

Hereinbelow, it is determined that when a hologram is recorded with the reference beam angle varied in the same region, the hologram corresponding to each Bragg angle is called a page, and a set of angular-multiplexed pages in the same region is called a book.

Figure 3:
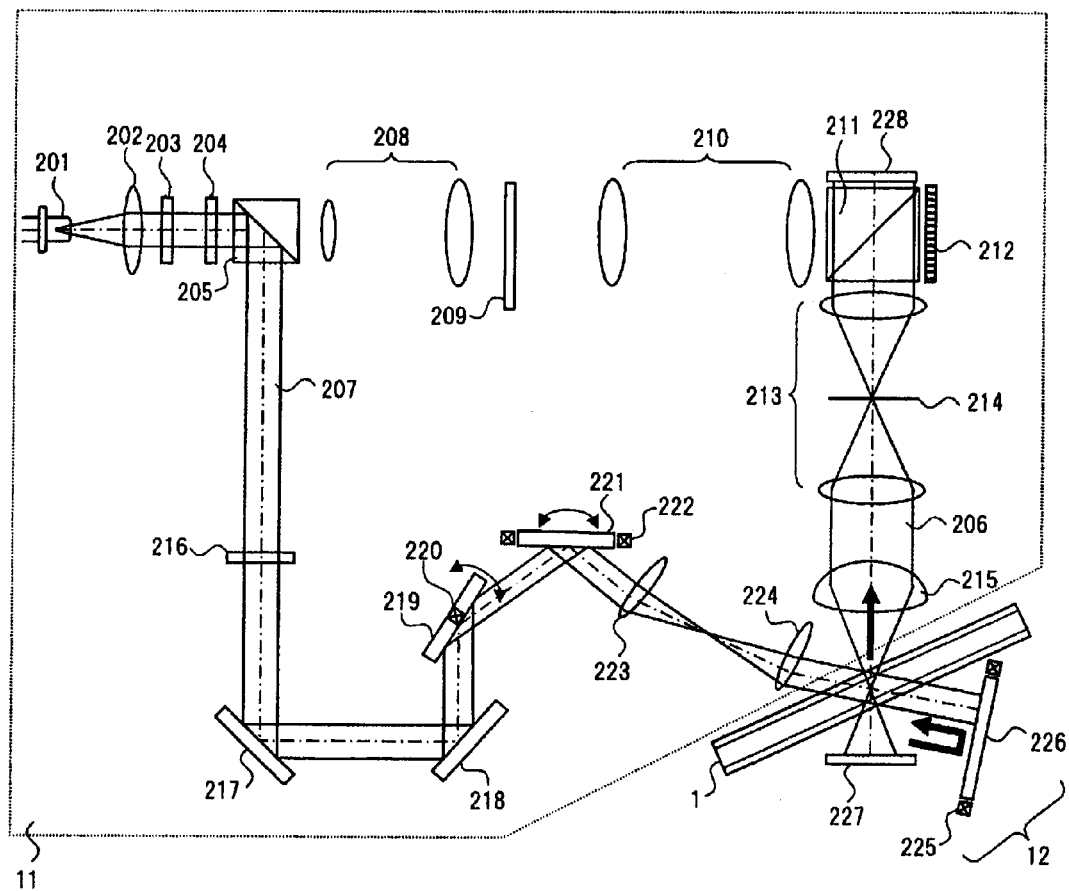
FIG. 3 is a schematic diagram showing a pickup when the hologram optical information-reproducing device is reproducing.
Figure 4:
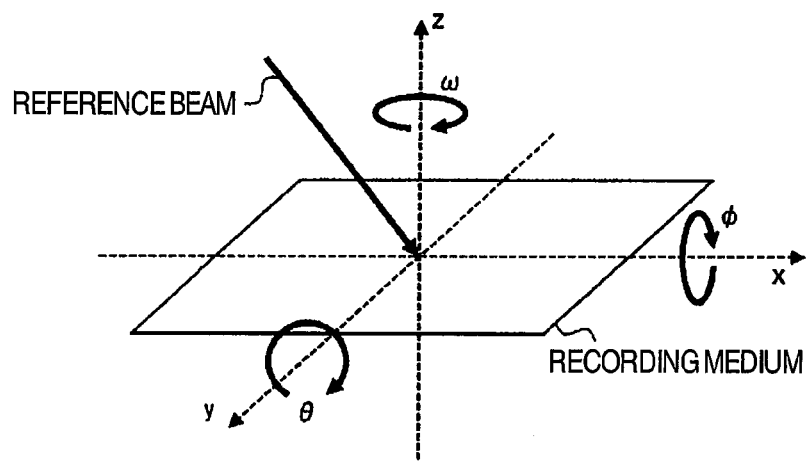
FIG. 4 is a schematic diagram showing an incidence angle of a reference beam to a hologram recording medium.
Figure 5:
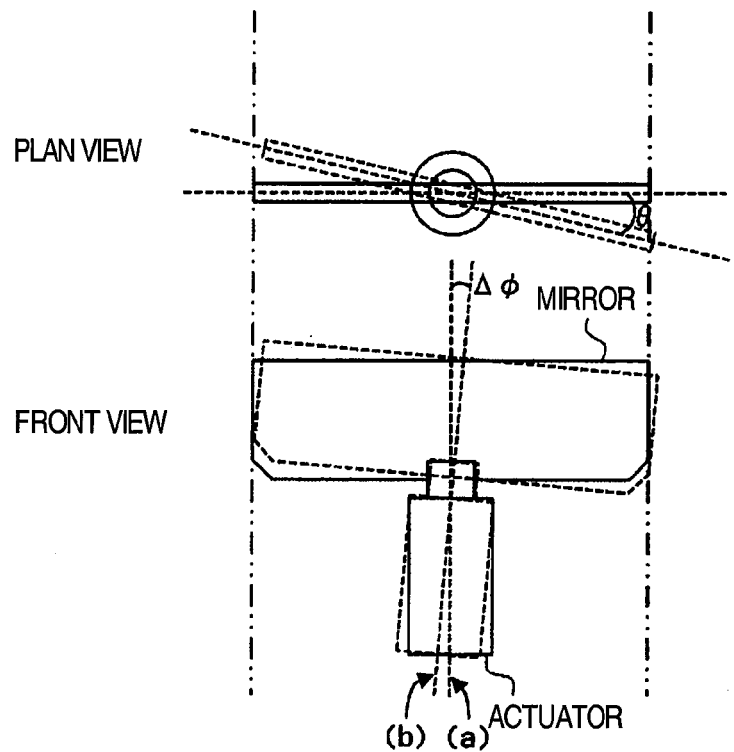
FIG. 5 shows plan and front views of an actuator when it is in an ideal state and when it has an orthogonal angle deviation.

FIG. 3 shows a reproducing principle of one example of a basic optical system structure of the pickup 11 and the reproducing reference-beam optical system 12 in the hologram optical-information reproducing device 10. In the case of reproducing the recorded information, the reference beam is made incident on the hologram recording medium 1 as described above, and the light beam transmitted through the hologram recording medium 1 is reflected by the optical element 226 the angle of which can be adjusted by the actuator 225 to generate its reproducing reference beam. On the other hand, the light beam which was made incident on the hologram recording medium 1 and diffracted in the opposite direction of the reproducing reference beam is detected by a photodetector 227. The photodetector 227 is positioned so that the light quantity detected by the photodetector 227 becomes maximum at the Bragg angle with which the light quantity of the photodetector 228 for detecting the reproducing reference beam becomes maximum. As the detector 227, a photo detection element, for example, photodiode can be used, but any element may be used if it can detect a light quantity diffracted toward the photodetector 227.

The reproduction beam reproduced by the reproducing reference beam propagates through the objective lens 15, the relay lens 213 and the spatial filter 214. Subsequently, the reproduction beam is transmitted through the PBS prism 211 and enters the photodetector 228, and the recorded signal can be reproduced. For the photodetector 228, an imaging element for example such as a CMOS image sensor or a CCD image sensor, can be used, but any element may be used if it can reproduce page data.

In this embodiment, the Bragg-angle control-signal generation circuit 31 has as input an output signal of an angle detecting sensor (not shown) which is provided on the actuator 220, detects a Bragg angle reflected by the optical element 219, and generates a signal for controlling the Bragg angle. Similarly, the pitch-angle control-signal generation circuit 34 has as input an output signal of an angle detecting sensor (not shown) which is provided on the actuator 222, detects a pitch angle reflected by the optical element 221, and generates a signal for controlling the pitch angle. As to the reproducing reference-beam optical system 12, the Bragg-angle control-signal generation circuit 31 has as input an output signal of an angle detecting sensor (not shown) which is provided on the actuator 225, detects an angle of the reference beam reflected by the optical element 226, and generates a signal for controlling the reference beam angle. For example, an optical encoder can be used for the angle detecting sensor which is provided on the actuator 220, the actuator 222 and the actuator 225.

Meanwhile, a recording technology using the angular multiplexing principle of the holography has a tendency that the allowable error against the deviation of the reference beam angle decreases considerably. Therefore, it may be configured that the angle detecting sensor provided on the actuator 220 is not used, but a mechanism for detecting a deviation amount of the reference beam angle is separately provided within the pickup 11, and a Bragg-angle control-signal generation circuit 85 has as input an output signal of the above mechanism to generate a signal for controlling the reference beam angle.

Figure 6:
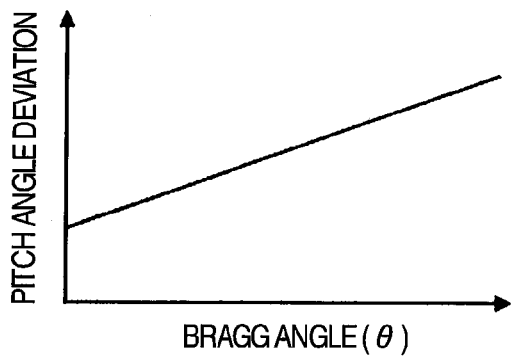
FIG. 6 is a schematic diagram showing a pitch-angle deviation amount from a Bragg angle when there is an orthogonal angle deviation.

To check the sensitivity of a linear change of a pitch angular deviation according to a Bragg angle change which is caused due to an orthogonal angle deviation of the rotating shaft resulting from a geometrical arrangement of both optical elements such as the optical element 219 and the optical element 221 mass produced and shown in FIG. 6, the hologram optical-information reproducing device 10 adjusts the optimum pitch angle before reproducing when the recorded hologram recording medium 1 is loaded.

Figure 8:
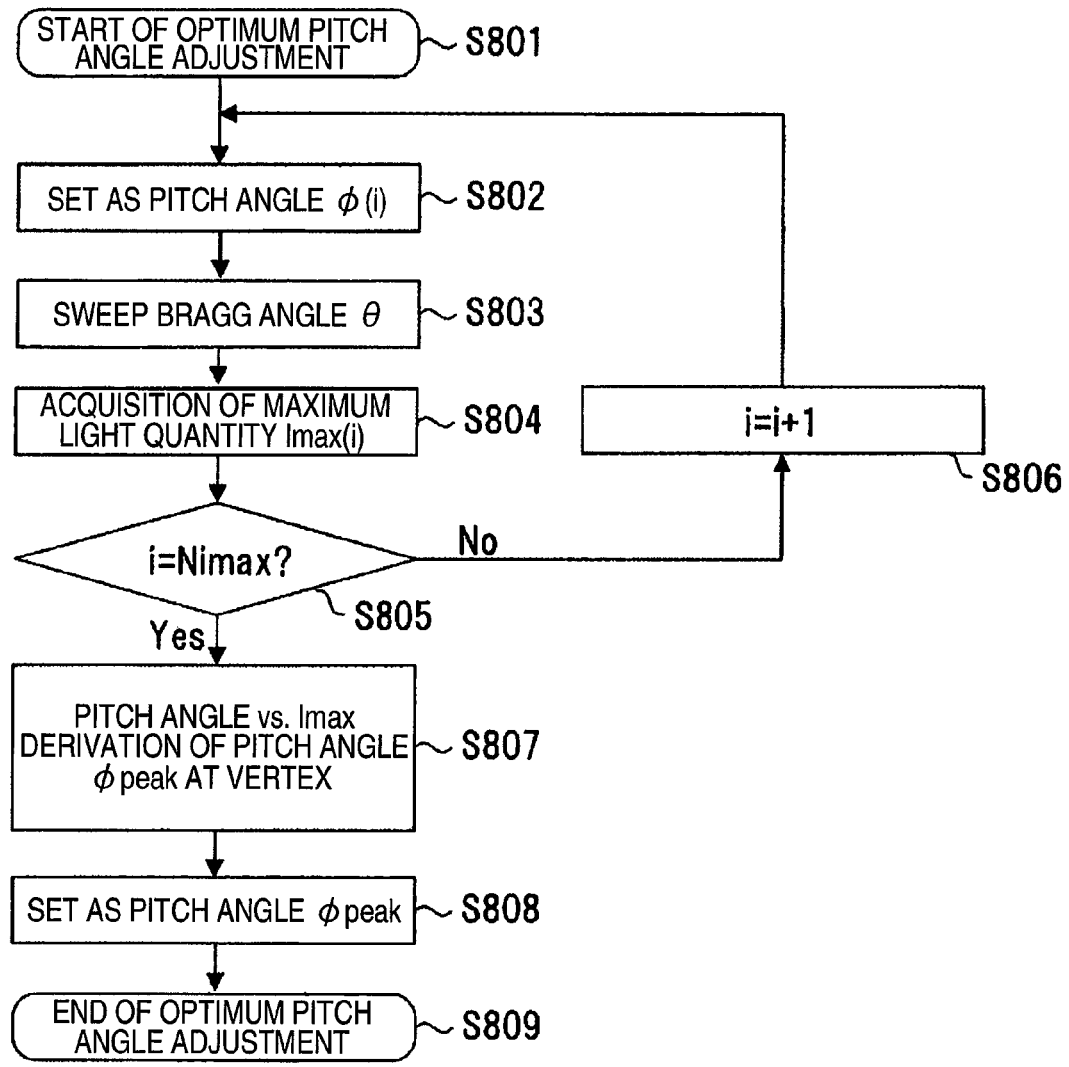
FIG. 8 is a flow chart showing optimum pitch-angle adjustment processing.
Figure 9:
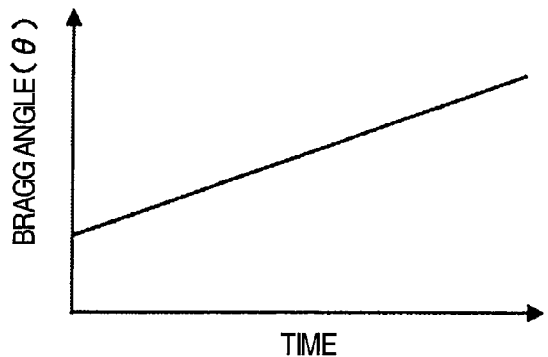
FIG. 9 is a schematic diagram showing a driving amount of a Bragg angle in step S803 of FIG. 8.
Figure 10:
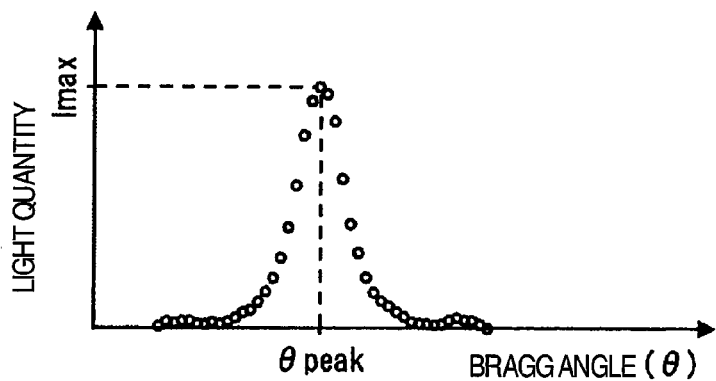
FIG. 10 is a schematic diagram showing a distribution of light quantity when driving a Bragg angle in step S804 of FIG. 8.

A method of adjusting the optimum pitch angle in this embodiment is described in detail with reference to FIG. 8. FIG. 8 shows a flow chart of an optimum pitch-angle adjusting method. When it is started to adjust the optimum pitch angle (step S801), the hologram optical-information reproducing device 10 drives the actuator 220 to set the pitch-angle to $\phi(i)$ which is one of pitch angles in an adjustment range. Then, the actuator 222 is driven as shown in FIG. 9 to drive the Bragg angle at a constant angular velocity from a minimum angle to a maximum angle in the adjustment range (step S803). When the detected light quantity of the photodetector 227 is obtained at a fixed sampling cycle when the Bragg angle is driven, there is obtained a graph with white circles with respect to the Bragg angle $\theta$ as in FIG. 10. According to the graph, the maximum value $I_{max(i)}$ of the light quantity can be obtained when the Bragg angle is driven at the pitch angle $\phi(i)$ (step S804). The angular velocity when the Bragg angle is driven in step S803 may not necessarily be constant, but it is determined to be a speed that $I_{max(i)}$ can be sufficiently obtained considering the sampling cycle of the photodetector 227. Further, the value obtained in step S803 may not necessarily be the maximum value of light quantity but may be a value that the photodetector has a correlation with the Bragg angle such as a value of, for example, a full width at half maximum. Alternatively, the value of $I_{m(i)}$ may be a value calculated from an interpolation according to a polynominal expression or the like derived on the basis of an actual sampling value. The Bragg angle $\theta_{peak}$ equivalent to $I_{max(i)}$ in step S803 means an optimum Bragg angle which has the light quantity as maximum and becomes substantially the same value independent of the value of i. In step S805, it is judged whether the current value of I is a final value of $N_{imax}$ in an optimum pitch-angle adjustment range. When i is not equal to $N_{imax}$ (No in S805), the process moves to step S806 where the value of i is incremented by 1, step S802 is performed again, and step S802 to step S805 are repeated until i becomes equal to $N_{imax}$. When i is equal to $N_{imax}$ (Yes in S805), the process moves to step S807. When the value of $I_{max(i)}$ conducted before the movement to step S807 is plotted with respect to each pitch angle $\phi(i)$, there is obtained a graph with white circles as in FIG. 11. In step S807, the plot points are approximated with a quadratic function, and a pitch angle $\phi_{peak}$ at the vertex of the quadratic function is derived from the derived function. In step S808, the actuator 220 is set to the optimum pitch-angle $\phi_{peak}$ derived in step S808, and the optimum pitch-angle adjusting process is completed (step S809). The adjustment of the optimum pitch angle is not limited to the method explained with reference to FIG. 8, but the adjusting method may be conducted on the basis of, for example, the features of the reproduction beam described in WO2011/018836.

Figure 12:
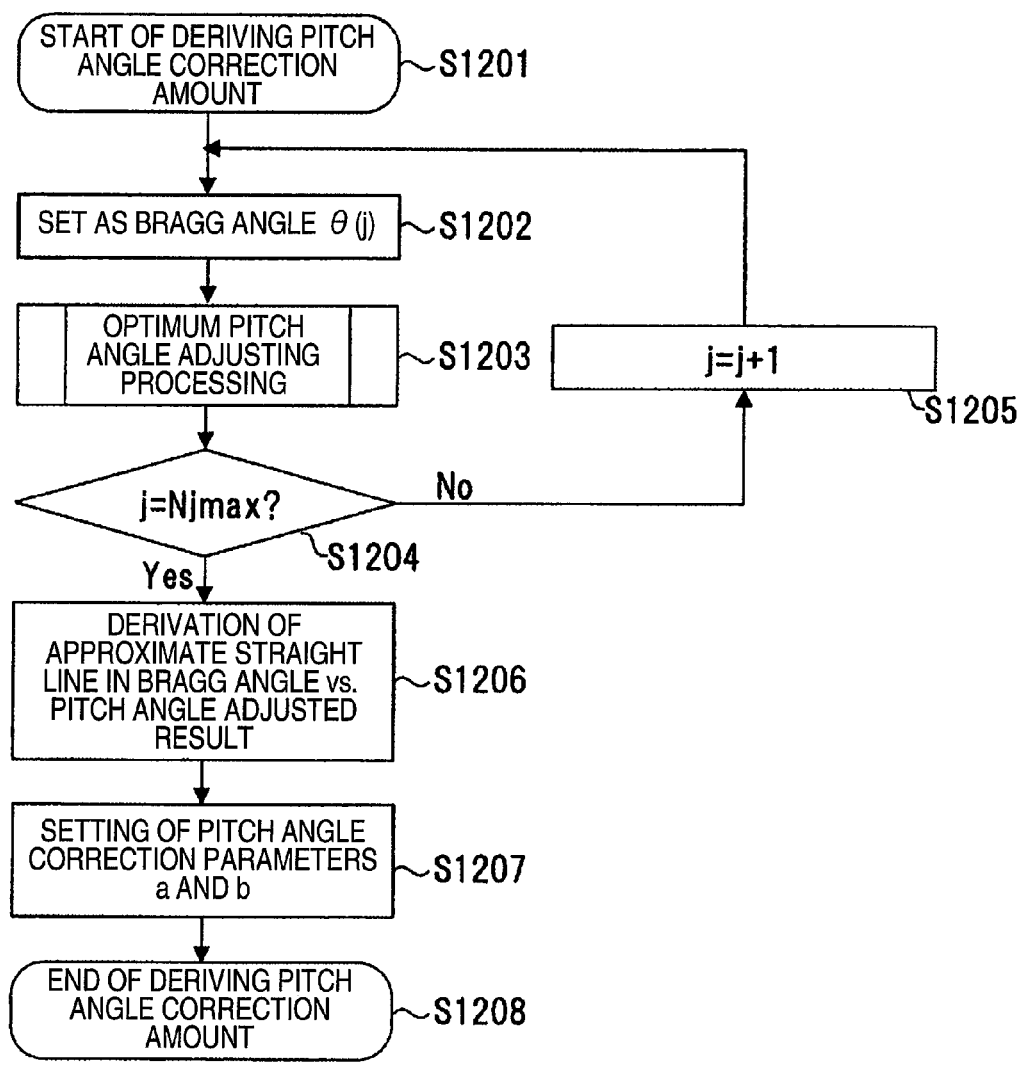
FIG. 12 is a flow chart showing pitch-angle correction amount deriving processing.
Figure 13:
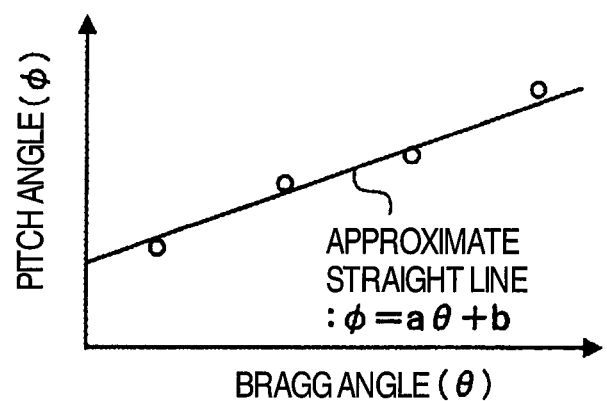
FIG. 13 is a schematic diagram showing a distribution of an optimum pitch-angle against a Bragg angle for deriving an approximation curve in step S1206 of FIG. 12.

The derivation processing of a pitch-angle correction amount in this embodiment is described in detail with reference to FIG. 12. FIG. 12 shows a flow chart of a method of deriving the pitch-angle correction amount. When the derivation processing of the pitch-angle correction amount is started (step S1201), the hologram optical-information reproducing device 10 drives the actuator 222 to set the Bragg angle to $\theta(j)$ which is one of Bragg angles in the adjustment range (step S1202). Then, the optimum pitch-angle adjusting processing shown in FIG. 8 is performed at the Bragg angle $\theta(j)$ (step S1203). In step S1204, it is judged whether the current value of j is a final value of $N_{jmax}$ in the pitch-angle correction amount derivation processing range. If j is not equal to $N_{jmax}$ (No in S1204), the process moves to step S1205, the value of j is incremented by 1, step S1202 is conducted again, and step S1202 to step S1204 are repeated until j becomes equal to $N_{jmax}$. If j is equal to $N_{jmax}$ (Yes in S1204), the process moves to step S1206. $N_{jmax}$ which is a criterion in step S1204 is a value of at least 2 or more, and with each value of j, values of plural angles from the minimum angle to the maximum angle of the corresponding Bragg angle $\theta$ are set. When the results of adjusting the plural optimum pitch angles $\phi_{peak}$ conducted before the process moves to step S1206 are plotted against each Bragg angle $\theta(j)$, there is obtained a distribution indicated by white circles shown in, for example, FIG. 13. In step S1206, linear approximation is obtained from the distribution result of white circles. The inclination a and intercept b of the derived approximate straight line represents the setting parameter of the pitch-angle correction amount when the Bragg angle is changed. In step S1207, the inclination a and the intercept b are set in the controller 80, completing the processing of deriving the pitch-angle correction amount (step S1208).

Figure 22:
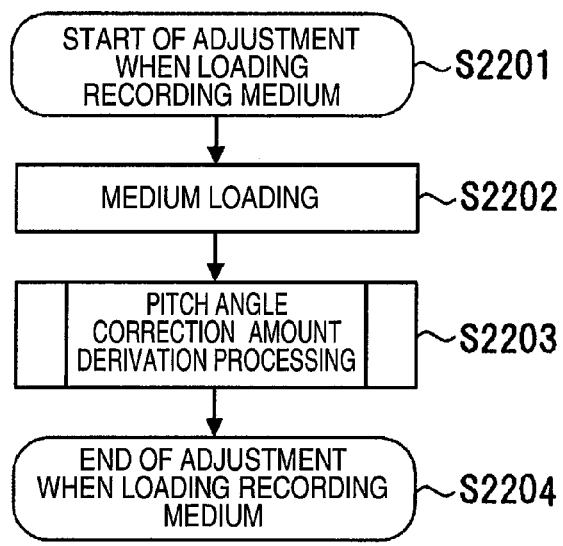
FIG. 22 is a flow chart showing the start of derivation processing of a pitch-angle correction amount.

The derivation processing of the pitch-angle correction amount shown in FIG. 12 is conducted in response to, for example, loading of the hologram recording medium 1 into the hologram optical information-reproducing device 10. The above processing is explained with reference to FIG. 22. When recording-medium loading-time adjustment is started (step S2201), the hologram recording medium 1 is loaded to the hologram optical-information reproducing device 10 (step S2202), the pitch-angle correction-amount derivation processing shown in FIG. 12 is then conducted (step S2203), and the recording medium loading time adjustment is completed (step S2204). The start of the pitch-angle correction-amount derivation processing is not necessarily limited to the flow chart of FIG. 22, but, for example, the processing may be conducted when the hologram optical-information reproducing device 10 is shipped, and values of the derived inclination a and intercept b may be held in the controller 80.

As described above, to secure the signal quality of the reproduction beam, the hologram optical-information reproducing device 10 must adjust the angle of the reference beam into a range that reproduction can be made for all of plural multiple-recorded page data. The reproducible range is a value specific to the device determined by the mechanical positioning accuracy, temperature change and moisture-absorbing characteristics of the medium, and the signal processing of reproduction page data in the hologram optical-information reproducing device 10. It is assumed that the reproducible lowest SNR in the hologram optical-information reproducing device is $SNR_{min}$. Here, SNR is an index indicating recording quality, and the recording quality is higher as the value is larger.

For controlling the pitch angle, fine settling accuracy of few millimeter degrees is required, so that a prism is used for the optical element 219 which polarizes the pitch-angle in this embodiment. Since the moment of inertia of the prism around its drive shaft is larger than that of the mirror, the time required for adjusting the pitch angle becomes long, and the transfer speed lowers when reproducing.

Therefore, this embodiment does not always conduct the correction of the pitch-angle correction amount $$\phi = a\theta + b \qquad \text{[Equation 1]}$$

derived according to FIG. 12 but discretely drives to suppress the transfer speed from lowering when reproducing.

Figure 14:
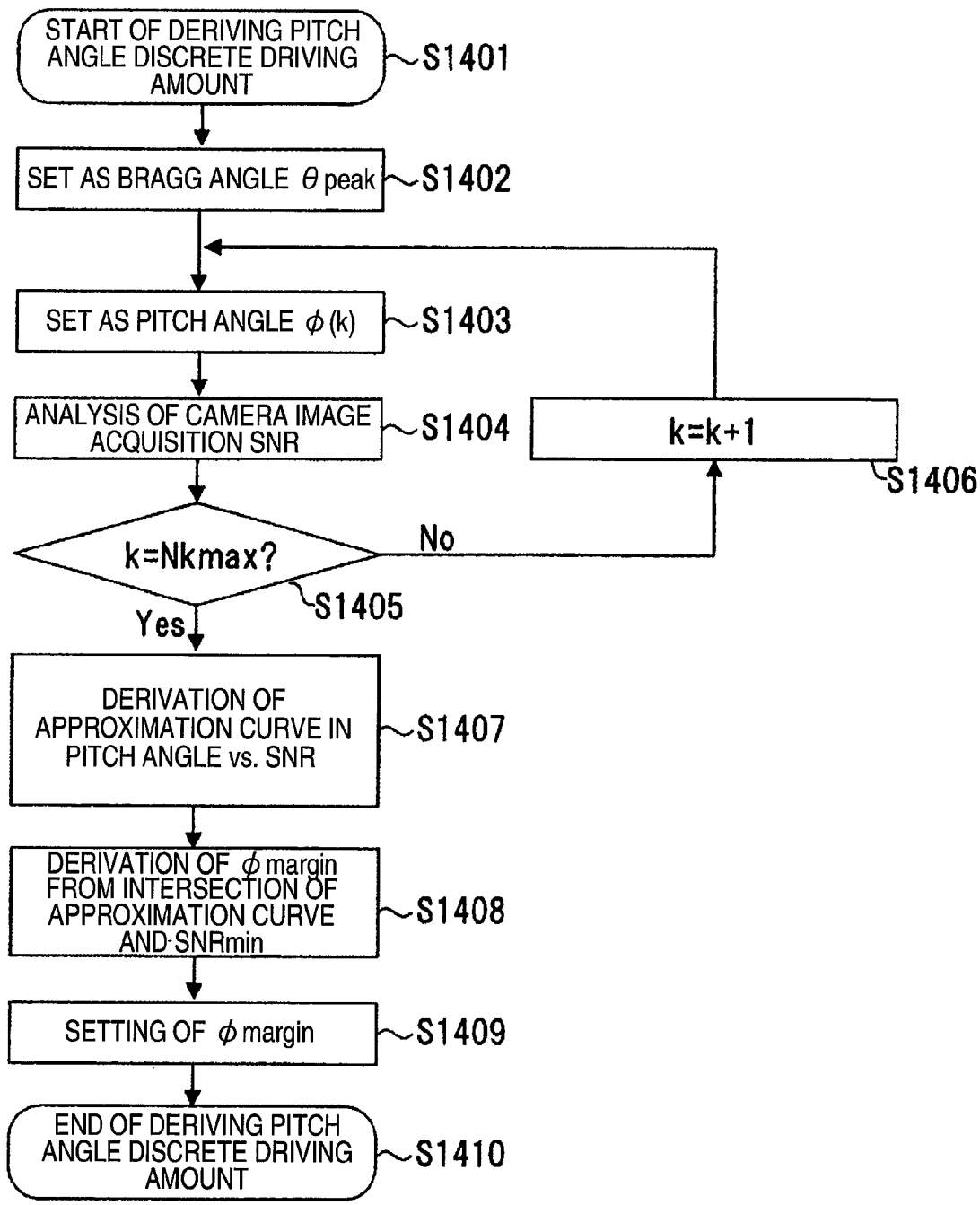
FIG. 14 is a flow chart showing derivation processing of a pitch-angle discrete driving amount.
Figure 15:
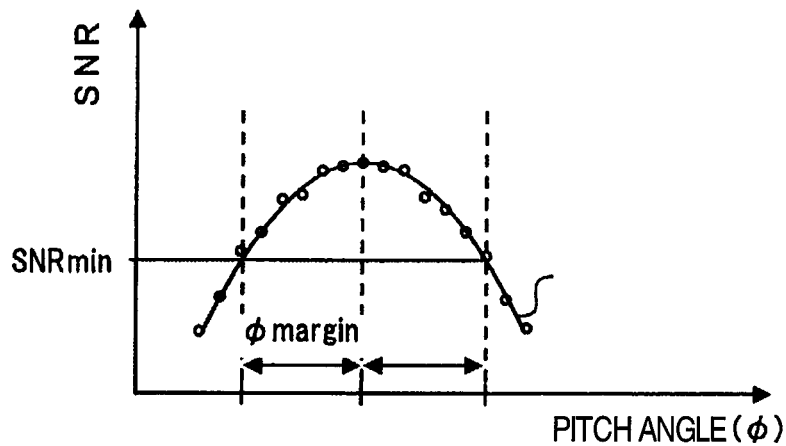
FIG. 15 is a schematic diagram showing a distribution of SNR with respect to a pitch-angle for deriving an approximation curve in step S1407 of FIG. 14.

Derivation processing of a discrete driving amount of a pitch angle in this embodiment is described in detail with reference to FIG. 14. FIG. 14 shows a flow chart of a method of deriving the pitch-angle discrete driving amount. When the derivation processing of the pitch-angle discrete-driving amount is started (step S1401), the hologram optical-information reproducing device 10 drives the actuator 222 to set the Bragg angle to an optimum Bragg angle $\theta_{peak}$ of a reproduction page (step S1402). Then, the actuator 220 is driven to set the pitch angle to $\phi(k)$ which is one of pitch-angles in the adjustment range (step S1403). In step S1404, a camera image at the above reference beam angle is obtained by the photodetector 228, signal processing of the camera image is performed by the controller 80, and SNR is obtained from the analysis result. In step S1405, it is judged whether the current value of k is the final value of $N_{kmax}$ in a range of the derivation processing of the pitch-angle discrete-driving amount. If k is not equal to $N_{kmax}$ (No in S1405), the process moves to step S1406, the value of k is incremented by 1, step S1403 is conducted again, and step S1403 to step S1405 are repeated until k becomes equal to $N_{kmax}$. If k is equal to $N_{kmax}$ (Yes in S1405), the process moves to step S1407. When the plural derived results of SNR obtained by conducting before the process moves to step S1407 are plotted against each pitch-angle $\phi(k)$, there is obtained a distribution indicated by white circles shown in, for example, FIG. 15. In step S1407, the plot points are approximated with a quadratic function on the basis of the above distribution to derive a function. In step S1408, pitch angle discrete-driving amount $\phi_{margin}$ is calculated from the intersection of $SNR_{min}$ and the quadratic function. Here, the $\phi_{margin}$ represents a difference of pitch angle at the intersection of $SNR_{min}$ from the pitch angle at the vertex of the quadratic function as shown in FIG. 15. In step S1409, the $\phi_{margin}$ is set in the controller 80, and the processing of deriving the pitch-angle discrete-driving amount is completed (step S1410).

Figure 16:
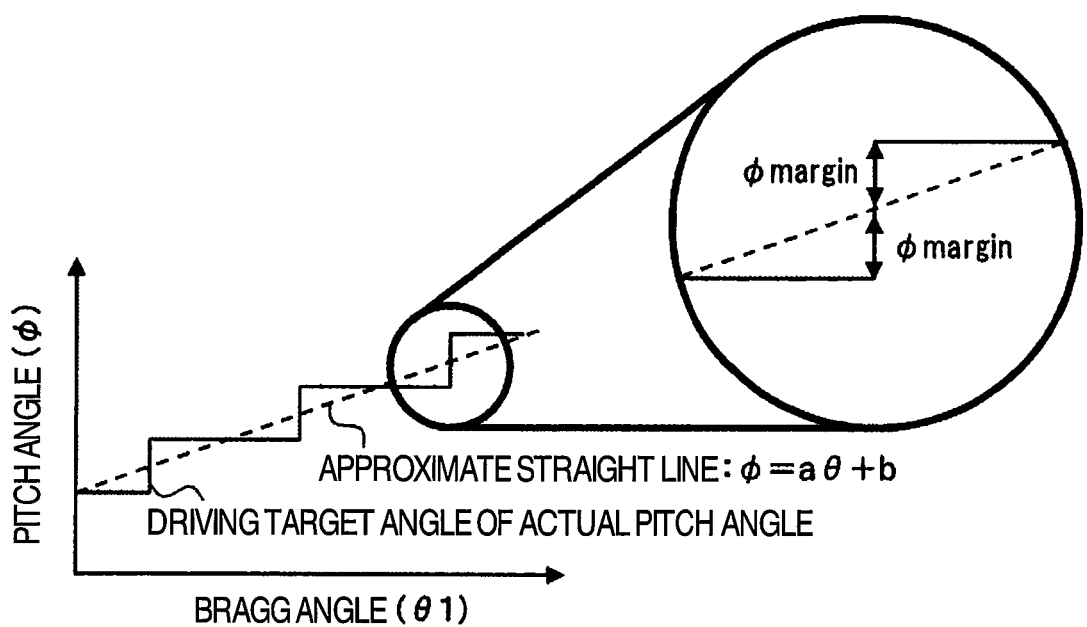
FIG. 16 is a schematic diagram showing a driving target angle at the time of discrete driving based on $\phi_{margin}$.

Based on the derived pitch-angle discrete-driving amount $\phi_{margin}$, this embodiment conducts the discrete driving of the pitch angle as shown in FIG. 16. Specifically, the actuator 222 is driven to change the Bragg angle in case of the Bragg angle that the pitch angle is deviated by $\pm\phi_{margin}$ or more against the pitch-angle correction amount $\phi=a\theta+b$ derived according to FIG. 12.

According to this embodiment, high reproduction quality can be realized while keeping high transfer speed.

Embodiment 2

Figure 11:
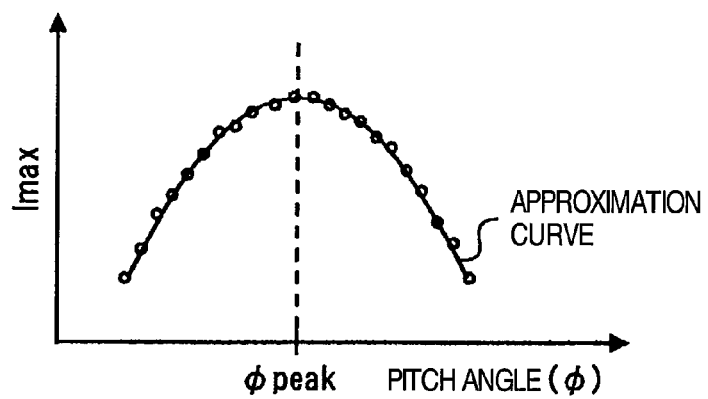
FIG. 11 is a schematic diagram showing a distribution of $I_{max}$ to a pitch-angle for deriving an optimum pitch-angle in step S807 of FIG. 8.

In Embodiment 1, the optimum pitch angle was adjusted by finding a pitch angle that the detected light quantity of the photodetector 227 became maximum while the pitch angle and the Bragg angle were varied two-dimensionally. However, when the optimum pitch angle is not within the angle range from the minimum to maximum of the pitch angle which is varied at the time of adjusting the optimum pitch angle, the approximation curve shown in FIG. 11 is different from the original correct shape, and there is a possibility that the value of $\theta_{peak}$ which is derived in step S807 of FIG. 8 deviates from the really optimum pitch angle. In such a case, it is possible to put the optimum pitch angle into the adjusting range by expanding the adjusting angle range of the optimum pitch angle, but if the adjusting angle is simply increased considerably without any index, time required for the adjustment of the optimum pitch angle becomes long, resulting in lowering the transfer speed.

Figure 17:
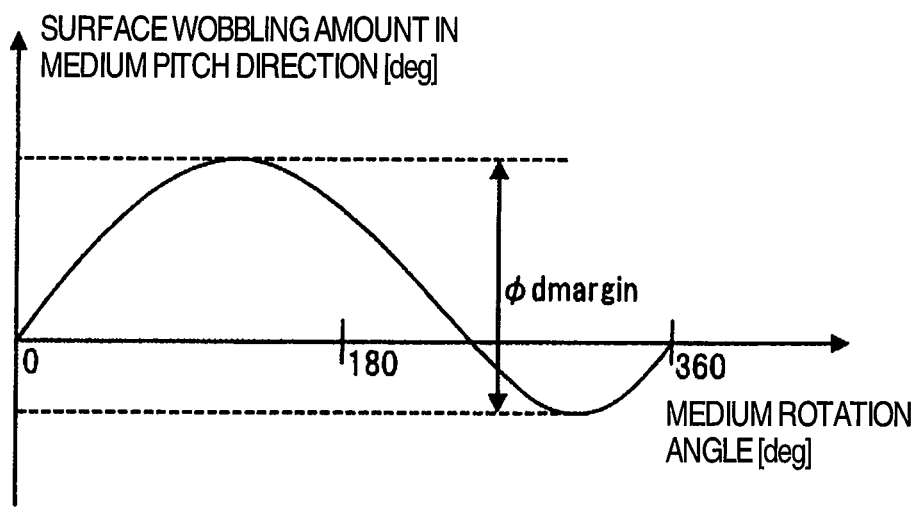
FIG. 17 is a schematic diagram showing a surface wobbling amount when the medium has surface wobbling against a pitch direction.

A cause of increasing the adjusting range required for the adjustment of the optimum pitch angle is considered to be a surface wobbling amount of the medium in a pitch direction against the rotation angle of the hologram recording medium 1 as shown in FIG. 17. The horizontal axis of FIG. 17 indicates a medium rotation angle having the spindle shaft of the hologram recording medium 1 as the center, and the vertical axis indicates a pitch direction component of the surface wobbling amount of the hologram recording medium 1 against the medium rotation angle. It is desirable that the flatness of the medium is zero ideally but the surface wobbling is caused in no small way in the manufacturing process of the hologram recording medium. In consideration of the mass production of the hologram recording medium 1, the surface wobbling amount can be limited by specifying the surface wobbling amount as a manufacturing specification.

In this embodiment, the surface wobbling amount of the hologram recording medium 1 is specified to be within $\phi_{dmargin}$ as a manufacturing specification. This embodiment assumes that the adjusting range $\phi_{ad}$ of the optimum pitch angle is set as a value of at least $\phi_{dmargin}$ or more and a minimum value capable of keeping the transfer speed, or the value of $\phi_{margin}$ (if possible considering the mass production of the hologram recording medium 1) is determined to be a value of the adjusting range $\phi_{ad}$ or less of the optimum pitch angle to decrease the time required to adjust the optimum pitch angle and to keep the transfer speed as much as possible.

Figure 18:
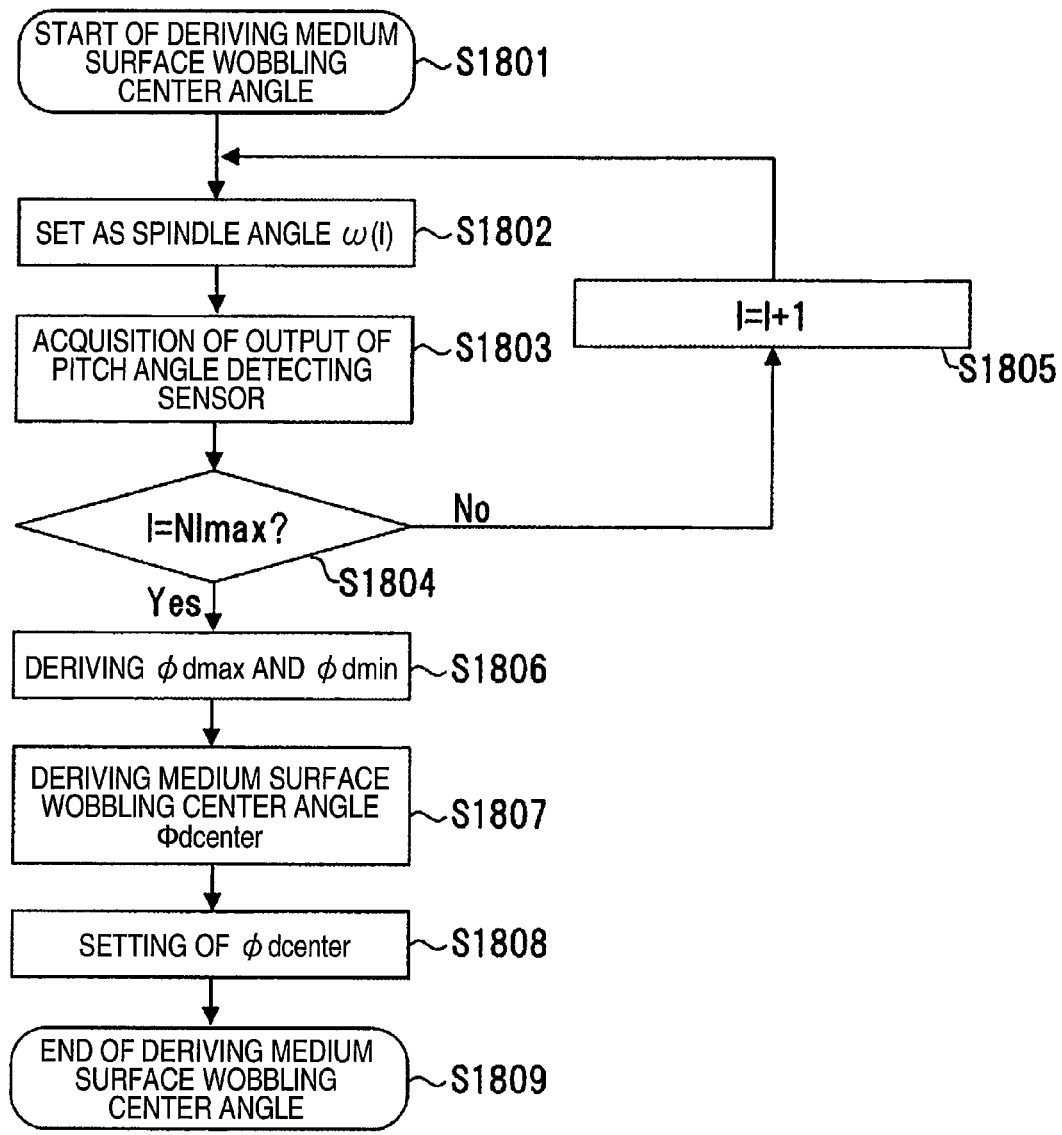
FIG. 18 is a flow chart showing derivation processing of a center angle of medium surface wobbling in Embodiment 2.
Figure 19:
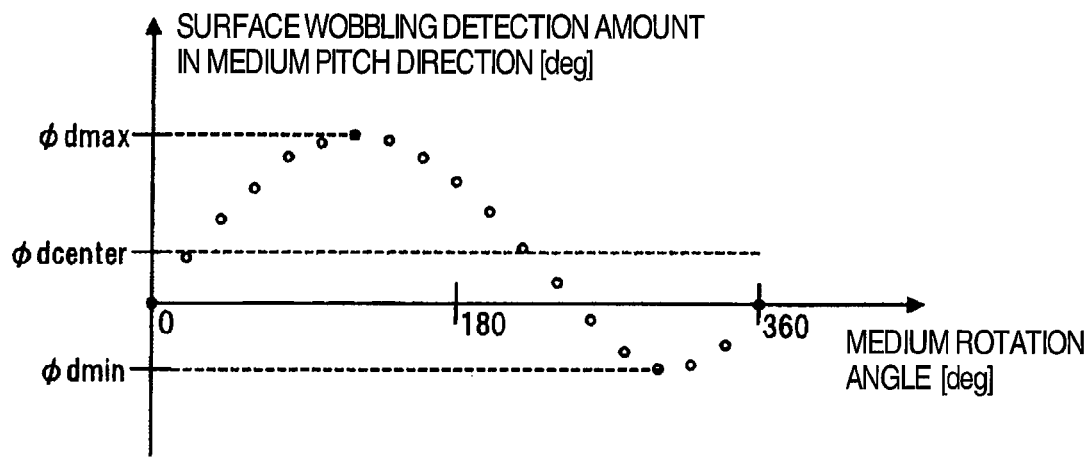
FIG. 19 is a schematic diagram showing a distribution of surface wobbling detection amount in a medium pitch direction against the medium rotation angle for deriving $\phi_{dmax}$, $\phi_{dmin}$ and $\phi_{dcenter}$ in step S1806 and step S1807 in FIG. 18.

Derivation processing of a center angle of the medium surface wobbling in this embodiment is explained in detail with reference to FIG. 18. FIG. 18 shows a flow chart of a method of deriving the medium-surface wobbling-center angle. When the derivation processing of the medium-surface wobbling-center angle is started (step S1801), the hologram optical-information reproducing device 10 drives the spindle motor 50 to set the medium rotation angle to $\phi(I)$ which is one of measurement angles (step S1802). In step S1803, output of the pitch-angle detecting sensor 16 at the medium rotation angle is obtained. In step S1804, it is judged whether the current value of I is a final value of $N_{Imax}$ in a range of the derivation processing of the medium-surface wobbling-center angle. If I is not equal to $N_{Imax}$ (No in S1804), the process moves to step S1805, the value of I is incremented by 1, step S1802 is conducted again, and step S1802 to step S1804 are repeated until I becomes equal to $N_{Imax}$. If I is equal to $N_{Imax}$ (Yes in S1804), the process moves to step S1806. When plural output values of the pitch-angle detecting sensor 16 conducted before the process moves to step S1806 are plotted against each medium rotation angle $\phi(I)$, there is obtained a distribution indicated by white circles shown in, for example, FIG. 19. In the above distribution, the output value of the pitch-angle detecting sensor 16 has a maximum value of $\phi_{dmax}$ and a minimum value of $\phi_{dmin}$, and the $\phi_{dmax}$ and the $\phi_{dmin}$ are derived in step S1806. Then, in step S1807, the medium-surface wobbling-center angle $\phi_{dcenter}$ is calculated as $$\phi_{dcenter}=(\phi_{dmax}+\phi_{dmin})/2 \qquad \text{[Equation 2]}$$

In step S1808, the derived $\phi_{dcenter}$ is set in the tilt angle change unit 52, and the medium-surface wobbling-center angle derivation processing is completed (step S1809).

Figure 20:
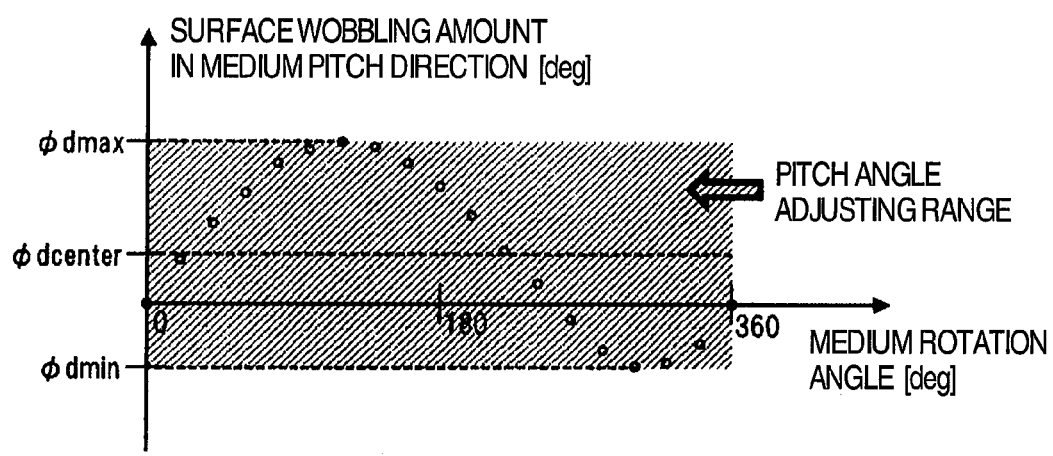
FIG. 20 is a schematic diagram showing a pitch-angle adjusting range in an ideal state that the tilt angle is set as $\phi_{dcenter}$.
Figure 21:
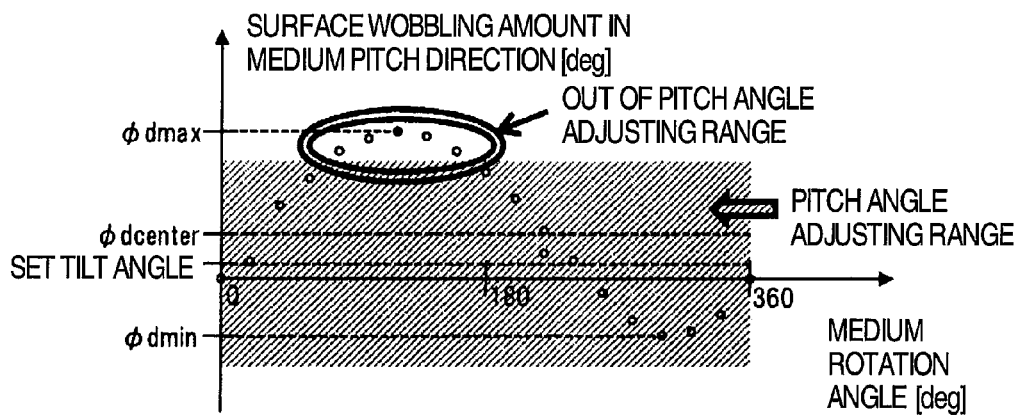
FIG. 21 is a schematic diagram showing a pitch-angle adjusting range in a state that a tilt angle is set to be outside $\phi_{dcenter}$.

When the tilt angle is set as the $\phi_{dcenter}$ derived by the processing shown in FIG. 18, the pitch-angle adjusting range falls in the range indicated by hatching in FIG. 20 and it is within the pitch-angle adjusting range even when the medium rotation angle is at any angle, and it is possible to adjust the optimum pitch-angle shown in FIG. 8. On the other hand, when the set tilt angle is different from the medium-surface wobbling-center angle $\phi_{dcenter}$ as shown in FIG. 21, some medium rotation angles enclosed in a double circle in the drawing are out of the pitch-angle adjusting range.

According to this embodiment, even when the recording medium has surface wobbling, high reproduction quality can be realized while keeping high transfer speed.

The above-described embodiments were explained in detail to make the present invention be understood easily. Therefore, the present invention is not limited to the above-described embodiments but includes various modifications and is not always limited to embodiments including all configurations described above. It is also possible to add a configuration of one embodiment to a configuration of another embodiment. And, the configuration of each embodiment can be partly provided with addition, deletion or substitution of another configuration.

The invention claimed is:
1. A hologram reproducing device which reproduces information from a recording medium having information recorded by interfering a signal beam and a reference beam, comprising:
a first light-angle change unit which changes an irradiation angle of the reference beam to the recording medium in a plane including an optical axis of the signal beam and a normal line of the recording medium;
a second light-angle change unit which changes the irradiation angle of the reference beam in a plane in a substantially vertical direction to the plane including the optical axis of the signal beam and the normal line of the recording medium;
a photodetector which detects a reproduction beam which is from the recording information medium;
a first light-angle drive-signal output unit which outputs a drive signal of the first light-angle change unit;
a first light-angle control unit which controls the first light-angle change unit via the first light-angle drive-signal output unit on the basis of output of the photodetector;

a second light-angle drive-signal output unit which outputs a drive signal of the second light-angle change unit;

a second light-angle control unit which controls the second light-angle change unit via the second light-angle drive-signal output unit; and a light-angle interpolation processing unit which controls a control target value of the second light-angle control unit by performing interpolation processing of a control target value of the first light-angle control unit and outputting the interpolation processed control target value to the second light-angle control unit.

2. The hologram reproducing device according to claim 1, wherein
the interpolation processing is processing for interpolating a control target value of the first light-angle control unit by a polynomial approximation.

3. The hologram reproducing device according to claim 2, wherein
the polynomial approximation is a linear functional approximation.

4. The hologram reproducing device according to claim 1, wherein
the interpolation processing is performed on the basis of at least two or more distributions which can be designated by the control target value of the first light-angle control unit and the control target value of the second light-angle control unit determined on the basis of output of the photodetector.

5. The hologram reproducing device according to claim 1, wherein
the light-angle interpolation processing unit controls the control target value of the second light-angle control unit at a discrete angle interval against the interpolated control target value.

6. The hologram reproducing device according to claim 4, comprising:
a first medium-angle change unit which rotates the recording medium;
a first medium-angle drive-signal output unit which outputs a drive signal of the first medium-angle change unit;
a first medium-angle control unit which controls the first medium-angle change unit via the first medium-angle drive-signal output unit;
a second medium-angle change unit which is fixed independent of the first light-angle change unit and the second light-angle change unit and changes an angle of the recording medium in a plane in a substantially vertical direction against a plane including an optical axis of the signal beam and a normal line of the recording medium;
a second medium-angle drive-signal output unit which outputs a drive signal of the second medium-angle change unit;
a second medium-angle detection unit which detects an angle of the recording medium in a plane in a substantially vertical direction against a plane including an optical axis of the signal beam and a normal line of the recording medium;
a second medium-angle control unit which controls the second medium-angle change unit via the second medium-angle drive-signal output unit on the basis of output of the second medium-angle detection unit; and
a control unit which controls the second medium-angle change unit of the recording medium to a center angle by calculating the center angle on the basis of a maximum angle and a minimum angle of the output of the second medium-angle detection unit when the recording medium is rotated at least one time or more by the first medium-angle change unit.

7. The hologram reproducing device according to claim 6, wherein
the control unit controls an angle of the recording medium to the center angle prior to the interpolation processing.

8. A hologram reproducing method for reproducing information from a recording medium having information recorded by interfering a signal beam and a reference beam, comprising:
a photodetecting step of detecting a reproduction beam which is from the recording information medium;
a first light-angle change step of changing a first light angle, which is an irradiation angle to the recording medium of the reference beam in a plane including an optical axis of the signal beam and a normal line of the recording medium, on the basis of the reproduction beam detected in the photodetecting step;
a second light-angle change step of changing a second light angle which is an irradiation angle of the reference beam in a plane in a substantially vertical direction against a plane including an optical axis of the signal beam and a normal line of the recording medium; and
a light angle interpolation processing step of changing the second light angle by performing interpolation processing on a control target value of the first light-angle change step and using a control target value of the second light-angle change step when performing the interpolation processing.

9. The hologram reproducing method according to claim 8, wherein
the interpolation processing is processing for interpolating a control target value of the first light-angle control unit by a polynomial approximation.

10. The hologram reproducing method according to claim 9, wherein
the polynomial approximation is a linear functional approximation.

11. The hologram reproducing method according to claim 8, wherein
the interpolation processing is performed on the basis of at least two or more distributions which can be designated by a control target value of the first light-angle control unit and a control target value of the second light-angle control unit determined on the basis of output of the photodetector.

12. The hologram reproducing method according to claim 8, wherein
the light angle interpolation processing step controls a control target value of the second light-angle control step at a discrete angle interval against the interpolated control target value of the first light-angle change step.

* * * * *